United States Patent [19]

Wu

[11] Patent Number: 5,185,860

[45] Date of Patent: Feb. 9, 1993

[54] AUTOMATIC DISCOVERY OF NETWORK ELEMENTS

[75] Inventor: Jeff C. Wu, Ft. Collins, Colo.

[73] Assignee: Hewlett-Packard Company, Palo Alto, Calif.

[21] Appl. No.: 519,187

[22] Filed: May 3, 1990

[51] Int. Cl.[5] .............................................. G06F 13/00
[52] U.S. Cl. .............................. 395/200; 364/DIG. 1; 364/284.4; 364/242.94; 364/222.81
[58] Field of Search ................... 364/DIG. 1; 370/54, 370/85.1, 85.12, 85.13, 85.15, 94.1; 395/200, 325, 800

[56] References Cited

U.S. PATENT DOCUMENTS

| | | |
|---|---|---|
| 4,644,496 | 2/1987 | Andrews ............................. 395/800 |
| 4,829,516 | 5/1989 | Orimo et al. .................. 370/85.12 X |
| 4,879,716 | 11/1989 | McNally et al. ............. 364/DIG. 1 |
| 4,914,571 | 4/1990 | Baratz et al. ................. 364/DIG. 1 |
| 4,918,598 | 4/1990 | Ashkin et al. ................ 364/DIG. 1 |
| 4,991,089 | 2/1991 | Shorter ......................... 364/DIG. 1 |
| 5,016,163 | 5/1991 | Jesshope et al. ............. 364/DIG. 1 |
| 5,051,987 | 9/1991 | Conlon ............................... 370/94.1 |
| 5,088,032 | 2/1992 | Bosack ......................... 364/DIG. 1 |

Primary Examiner—Thomas M. Heckler

[57] ABSTRACT

Disclosed is a computer network node discovery system that provides a general way of discovering network elements, or nodes, connected to a computer network, and a specific algorithm for discovering nodes connected to a TCP/IP network, using the SNMP protocol available within the TCP/IP network software. Some nodes on a network, called discovery agents, can convey knowledge of the existence of other nodes on the network. The network discovery system queries these agents and obtains the information they have about other nodes on the network. It then queries each of the nodes obtained to determine if that node is also a discovery agent. In this manner, most of the nodes on a network can be discovered. The process of querying discovery agents to obtain a list of nodes known to the discovery agents is repeated at timed intervals to obtain information about nodes that are not always active. In a TCP/IP network, discovery agents are nodes that respond to queries for an address translation table which translates internet protocol (IP) addresses to physical addresses. The data from each node's address translation table is used to obtain both the IP and the physical address of other nodes on the network. These nodes are then queried to obtain additional information. After all the nodes on a network are discovered, the list of nodes is written to a database where it can be displayed by the network manager or other users of the network.

16 Claims, 17 Drawing Sheets

AUTOMATIC DISCOVERY OF NETWORK ELEMENTS

FIELD OF THE INVENTION

This invention relates to computer systems and more particularly to computer networks that interconnect computers. Even more particularly, the invention relates to determining the nodes connected to a network.

BACKGROUND OF THE INVENTION

Computer networks are collections of hardware and software that connect computers and allow them to send information from one computer to another electronically. A computer network is comprised of the physical hardware connections between the various computers, for example telephone lines or a coax cable, and the software used to send and receive data and to route the data to the selected computer on the network.

A local area network (LAN) is a network connection between computers in close proximity, typically less than one mile, and usually connected by a single cable such as coax cable. A wide area network (WAN) is a network of computers located at longer distances, often connected by telephone lines or satellite links. Network software may sometimes be used with both types of networks. For example, a popular network is the Department of Defense internetworking protocol suite, known as Transmission Control Protocol/Internet Protocol (TCP/IP). This system was originally developed by the Defense Advanced Research Projects Agency (DARPA) and has now been widely distributed to Universities and industry.

When a network is fast growing, that is, network elements or nodes are being added frequently, a network administrator may not know all of the nodes connected to the network. Also, a network administrator new to his or her job may not be familiar with the nodes on the network. Determining the nodes manually is a difficult problem. The administrator may contact all the users of the network known to the administrator, however, infrequent users may be forgotten and not contacted. Also, if a node is connected to the network, but not active because the computer is not powered up or is inoperative, that node may not be included in the list. In a very short local area network, a network administrator may physically trace the cable of the network to determine which nodes are located on the network. However, since longer local area networks can extend as far as a mile, through many floors and offices within a building, physical tracing may be impossible. In a wide area network, physical tracing is almost always impossible.

For some commonly used networks, special equipment can be purchased that will determine the nodes located on the network and the distance between them. This equipment, called a probe, is often limited by the other components of the network, however. For example, in a local area network, a repeater unit may be used to extend the effective distance of the local area network to a distance greater than is capable with a single cable. A repeater unit amplifies signals, and therefore will not allow a probe to determine the location of nodes beyond the repeater.

Other units connected to the network may obscure nodes. For example a bridge unit connects two similar networks but only passes messages that are being sent from a node on one side of the bridge to a node on the other side of the bridge. It will not pass messages between nodes on the same side, in order to reduce the traffic on the other side of the bridge. A bridge will prevent a probe from determining the nodes on the other side of the bridge. A gateway is a unit that connects dissimilar networks to pass messages. Because a gateway may have to reformat a message to accommodate a different network protocol, it will prevent a probe from finding nodes beyond the gateway.

There is need in the art then for a method of determining the nodes on a local area network. There is further need in the art for determining such nodes without the use of special equipment. A still further need is for a method that will determine which nodes are located beyond the repeater units, bridges, and gateways on a network.

SUMMARY OF THE INVENTION

It is an object of the present invention to provide a method of determining the elements or nodes connected to a network.

It is another object of the invention to provide a method of discovering network nodes on a TCP/IP network.

Another object of the invention is to determine which discovered nodes are discovery agents and can convey knowledge of the existence of other nodes on the network.

Another object is to query all discovery agents and ask for other nodes on the network.

A further object is to query all TCP/IP nodes to retrieve the address translation table from the TCP/IP node.

The above and other objects of the invention are accomplished in a system which provides a general way of discovering network elements, or nodes, and a specific algorithm for discovering nodes within a TCP/IP network, using a standard Simple Network Management Protocol (SNMP), which is available within the TCP/IP network.

Some nodes on a network can convey knowledge of the existence of other nodes on a network, and are called discovery agents. When a network contains discovery agents, these agents can be queried to obtain the information they have about other nodes on the network. By obtaining a list of nodes from a single discovery agent, and querying each of the nodes obtained to determine if it is also a discovery agent, most of the nodes on a network can be discovered.

The process of querying discovery agents to obtain a list of nodes known to be discovery agents, must be repeated at timed intervals. At any given time on a network, one or more nodes may not be responding to the network, either because it is inoperative, or because it is not powered up. Therefore, if the discovery process is attempted during this time, these unavailable nodes will not be discovered. By repeating the discovery process over time at regular intervals, additional nodes on a network can be discovered.

In a TCP/IP network, discovery agents are nodes that respond to queries for an address translation table. Within TCP/IP network, every node will have an internet protocol (IP) address. This address is a 32 bit number and is unique to all nodes within the TCP/IP network. Although the IP address is probably unique to all nodes everywhere that use the TCP/IP protocol, the physical address of a node on a particular network will be different from the IP address. For example, some types of LANs use an 8 bit address, and can therefore use the low order 8 bits of the IP address, however, some other types of LANs use a 48 bit address and cannot use the internet address. Therefore, every node within a TCP/IP network must have an address translation table which translates the IP address to the physical address. The data from each node's address translation table can be used to obtain both the IP and the physical address of other nodes on the network. Again, as described in the above general algorithm, the queries should be repeated at timed intervals to insure that recently activated nodes are discovered. Another reason for repeating the discovery process over timed intervals in a TCP/IP network is that some of the information within a node's address translation table may be purged if the node does not use the information after a period of time. This purge is used to reduce the table size requirements within a node. By repeating the queries at timed intervals, the greatest amount of translation table information may be obtained.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
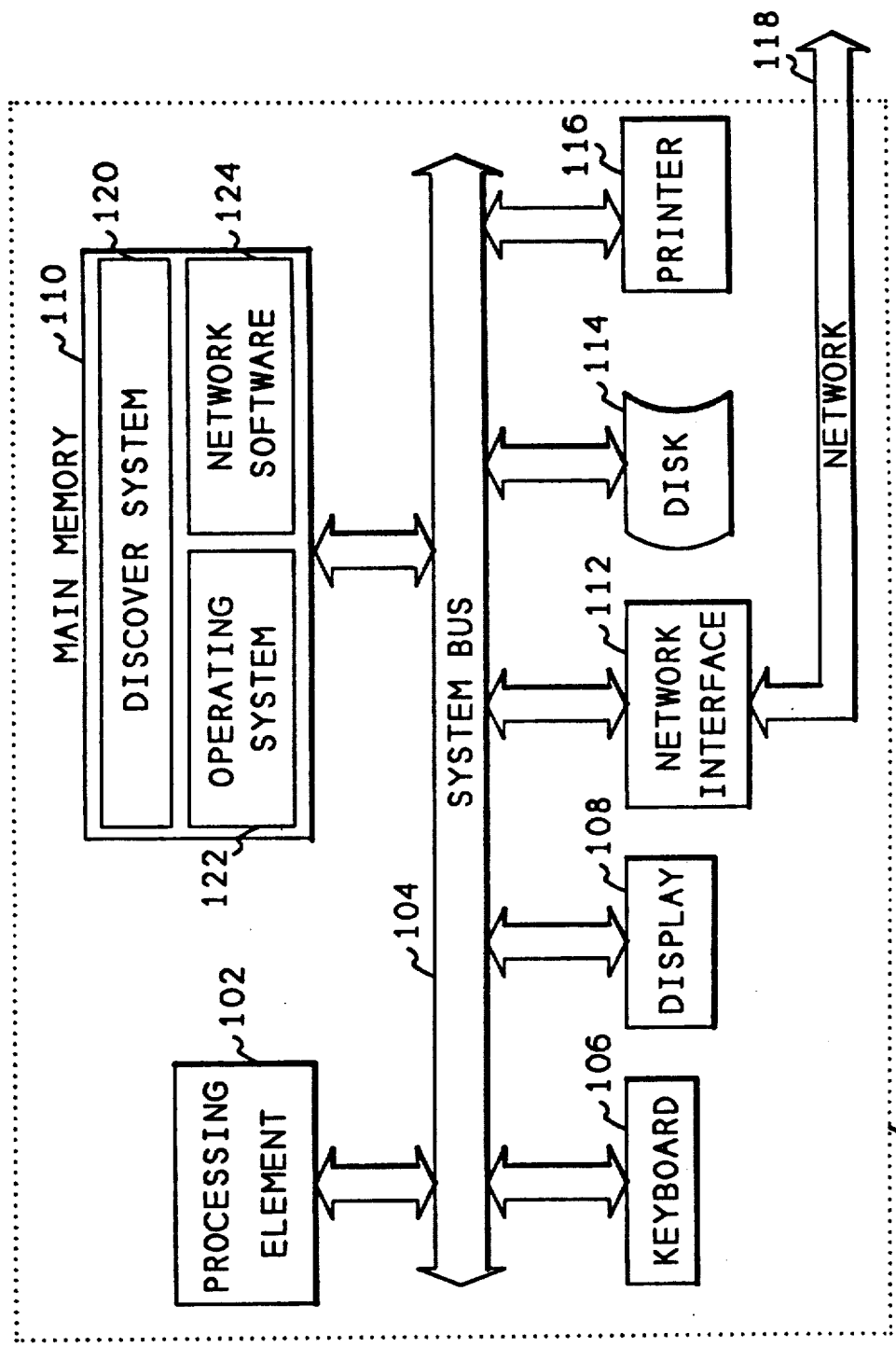
FIG. 1 shows a block diagram of the hardware of the node that runs the process of the present invention.

FIG. 1 shows a block diagram of the computer hardware that contains the discovery system of the present invention. Referring now to FIG. 1, a computer system 100 contains a processing element 102. The processing element 102 communicates to other elements within the computer system 100 over a system bus 104. A keyboard 106 is used to input information from a user of the system, and a display 108 is used to output information to the user. A network interface 112 is used to interface the system 100 to a network 118 to allow the computer system 100 to act as a node on a network. A disk 114 is used to store the software of the discovery system of the present invention, as well as to store the data base collected by the discovery system. A printer 116 can be used to provide a hard copy output of the nodes of the network discovered by the discovery system. A main memory 110 within the system 100 contains the discovery system 120 of the present invention. The discovery system 120 communicates with an operating system 122 and network software 124 to discover the nodes on the network 118.

Figure 2:
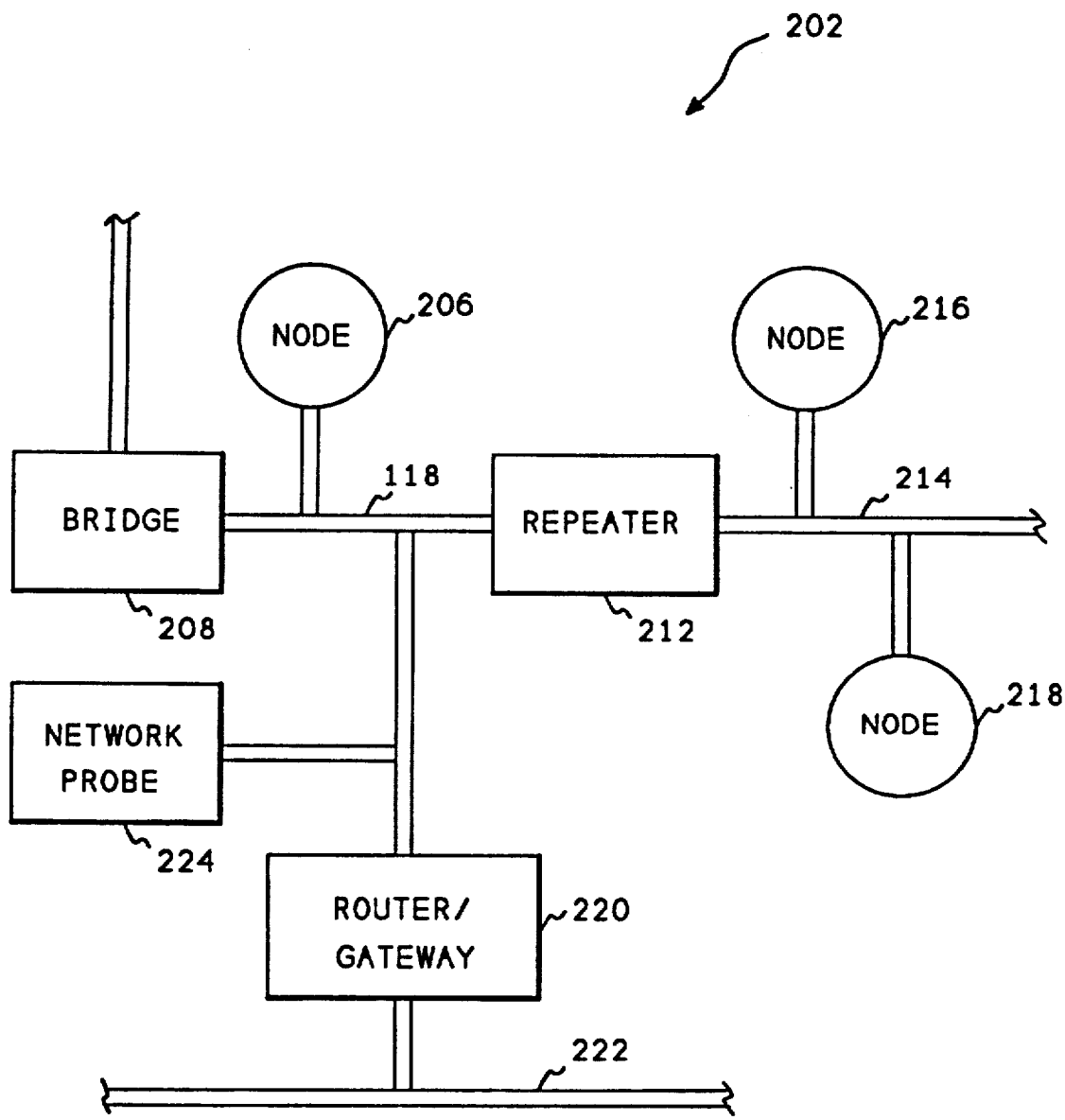
FIG. 2 shows a diagram of a typical computer interconnection network.

FIG. 2 shows a diagram of a network. Referring now to FIG. 2, a network 202 contains a node 206. Node 206 contains the processor 100 (FIG. 1) which contains the discovery system software of the present invention. Node 206 is attached to a first network segment 118. The network segment 118 is connected to a repeater 212 which is connected to a second network segment 214. This second network system 214 has nodes 216 and 218 attached to it. A repeater, such as repeater 212, allows network segments to be connected to allow a network to be extended over a longer distance. An important characteristic of a repeater is that there is no translation of data passing through it. That is, every message that is transmitted on one network segment, will pass unchanged through a repeater to the other network segment. Therefore, any messages broadcast, for example, by node 206 will be received by node 216 and node 218 after these messages pass through repeater 212.

Network segment 118 is also attached to a bridge 208 which connects it to a third network segment 210. A bridge will only pass messages that are being transmitted from a node on one side of the bridge to a node on the other side of the bridge. It will block messages that are transmitted from a node on one side of the bridge to a node on that same side of the bridge. This characteristic reduces network traffic on various segments of a network.

Segment 118 is also attached to a router/gateway 220 which connects is to a fourth network segment 222. Routers are devices that connect network segments which have similar characteristics. Gateways are devices which connect networks having different types of characteristics. For example, a gateway might connect a local area network to a wide area network.

Because bridges, routers, and gateways, must process the messages sent over the network, they also must contain information about which nodes are on the network. Therefore, bridges, routers, and gateways are authoritative sources of information for determining the nodes on the network. A protocol defines the format of messages that are sent across a network. One popular protocol is the Department of Defense Internetworking Protocol Suite, popularly known as TCP/IP. Because it was developed by the Department of Defense, this protocol is widely available and used extensively, particularly in a university environment. Also, this suite of protocols is very popular on the UNIX operating system and has seen wide distribution there. The internet protocol (IP) uses a single thirty-two bit address for all nodes that can be connected to the internet at any location. Physical addresses within a particular type of network, are normally different from an IP address. If a network address is very small, perhaps eight bits, it may be the same as the low order eight bits of the IP address. If a network address is large, for example, some LANs use forty-eight bit addresses, it is impossible for these addresses to correspond directly to IP addresses. Therefore, both an IP address and a physical address exist for each node on a network. Devices such as routers, gateways, and bridges, which can send messages from one network to another must be able to translate between IP addresses and physical addresses. Therefore, these devices have translation tables which allow them to translate between these two types of addresses. By accessing these translation tables, one of the nodes on a network can obtain information about the other nodes on the network. The existence of these translation tables allow the method of the present invention to perform its function.

A network probe 224 is also attached to the network 118. A network probe 224 is a device that assists in locating defective nodes and assists in repairing those nodes. Since it is a testing device, it may or may not be attached to a network at any given time. When a probe is attached to a network, the discovery system of the present invention can query the probe and use information obtained from the probe to assist in discovering other nodes on the network.

Figure 3:
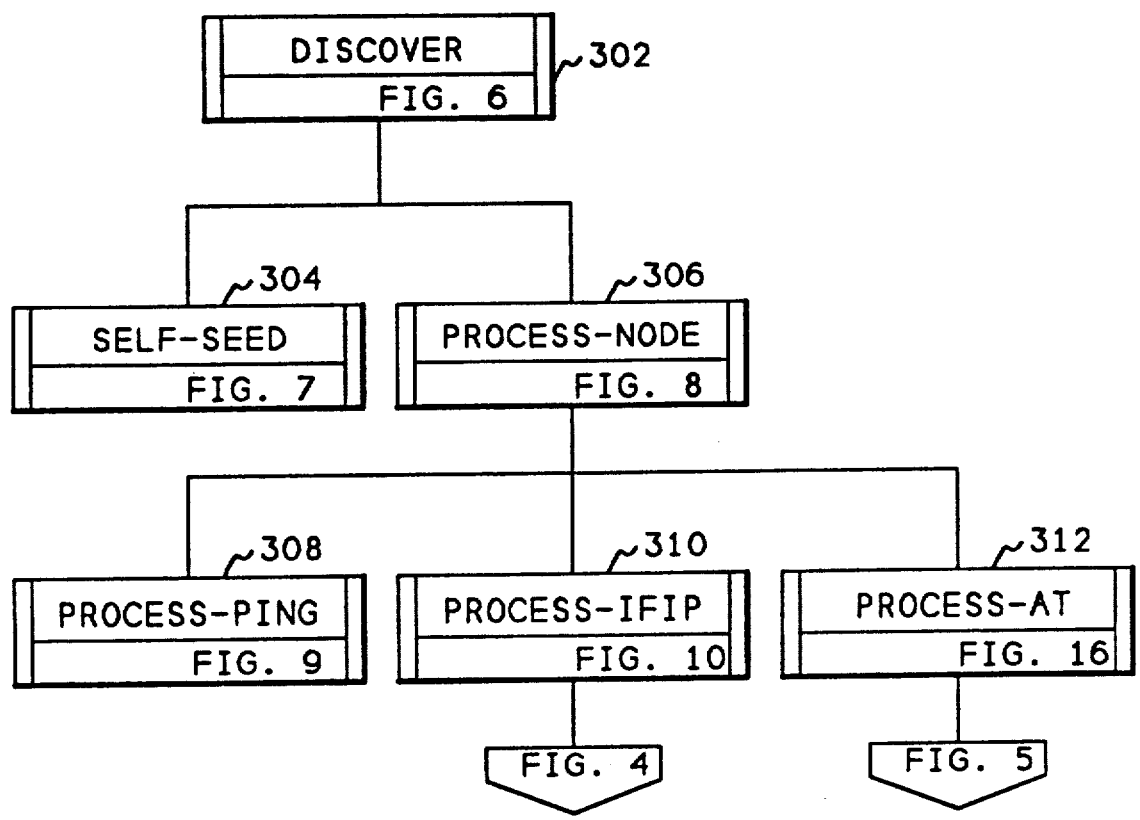
FIGS. 3 through 5 show a hierarchy diagram of the modules of the discovery system of the present invention.
Figure 4:
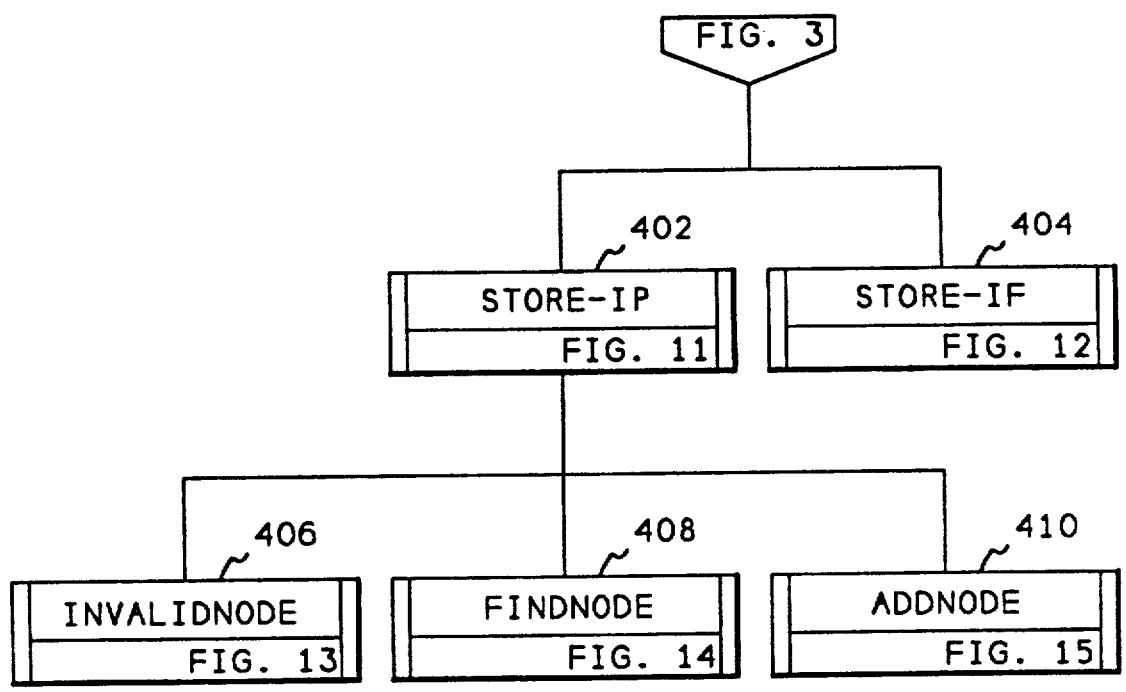
Figure 5:
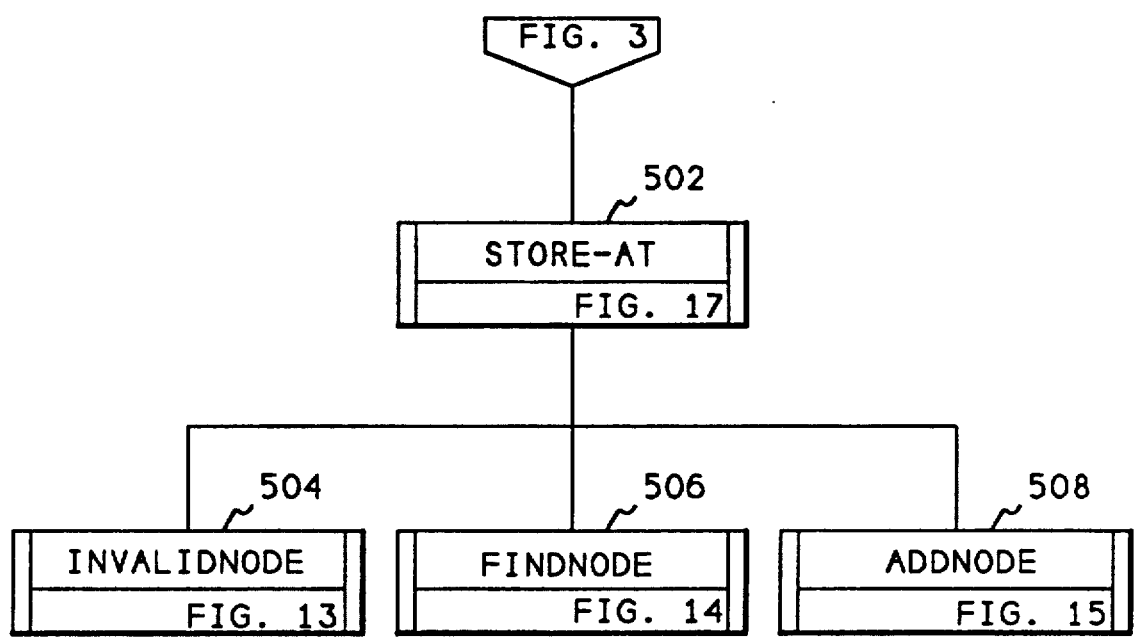

FIGS. 3 through 5 show a hierarchy diagram of the modules of the software of the present invention. Referring now to FIGS. 3 through 5, discovery module 302 is the main module of the system. Discovery calls self-seed block 304 to start the process of building a database about the network, and it calls process-node block 306 to process information about each node that it obtained from self-seed. Process-node block 306 calls process-ping block 308 to query a node on the network to determine if that node is active. Process-node block 306 also calls process-IFIP block 310 for each IP address that it obtains. Process-IFIP block 310 calls store-IP block 402 for each IP address, and store-IP block 402 calls invalid-node block 406, findnode block 408, and addnode block 410, for each IP address. For each IF entry (physical address) received, process-IFIP block 310 calls store-IF block 404. For each address translation table entry, process-node block 306 calls process-AT block 312 which in turn calls store-AT block 502. Store-AT block 502 calls invalidnode at block 504, findnode block 506, and addnode block 508.

Figure 6:
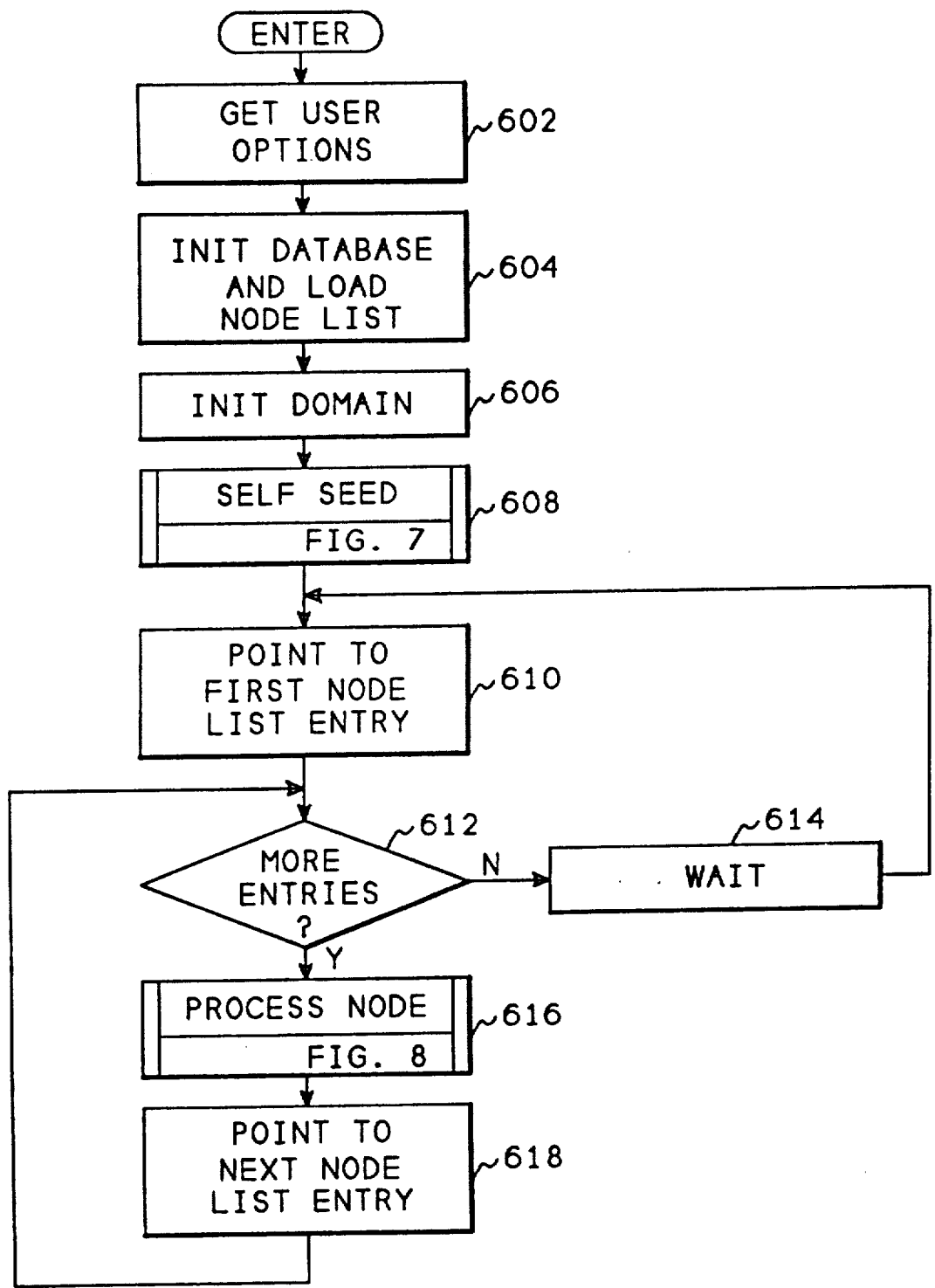
FIG. 6 shows a flowchart of the main module of the invention.

FIG. 6 shows a flowchart of the discovery module block 302 (FIG. 3). Referring now to FIG. 6, after entry block 602 gets any options that the user wishes to enter. Block 604 then initializes the database used to permanently store the nodes, and loads node list from existing entries in the database. If a database for the network does not exist, the discovery system has the ability to create that database. If a database of the network already exists, the discovery system will use the node information which is already available in that database to query other nodes within the system.

Block 606 then initializes domains. A domain defines the limit beyond which the user of the discovery system does not wish to find nodes. That is, the domain limits the range of the discovery process. This limitation is necessary on large networks, to keep the amount of processing to reasonable level. Furthermore, a user usually is only interested in the nodes on a particular network segment, or the network segment connected by repeaters and possibly bridges.

Figure 7:
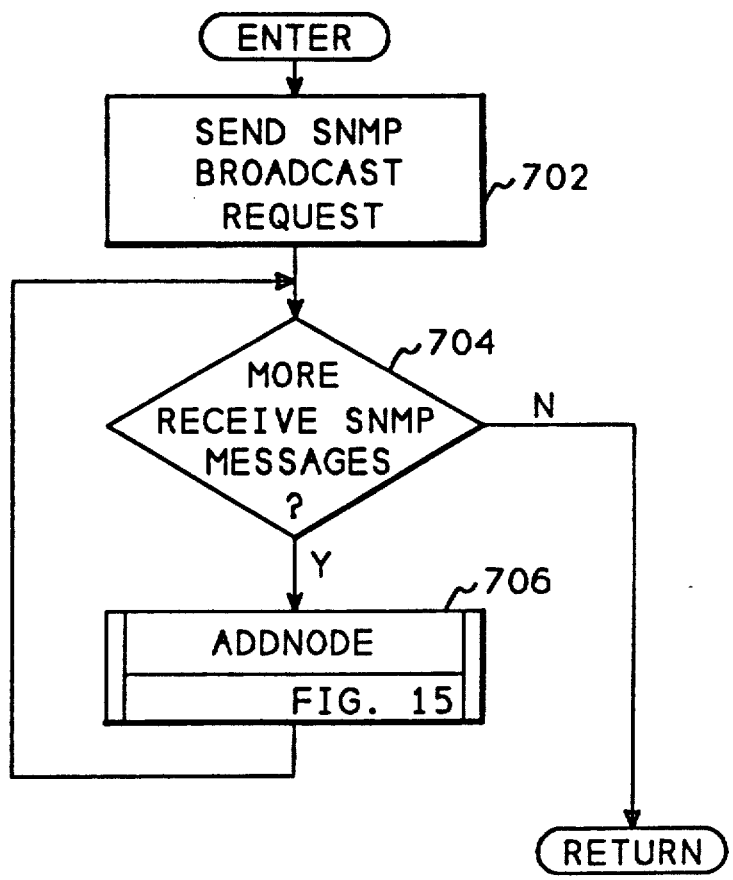
FIG. 7 shows a flowchart of the self-seed module of the invention.

Block 608 then calls FIG. 7 to self-seed the system. If no entries were available in the database, the discovery system can self-seed by sending a broadcast message and determine who responds to that message. After returning from self-seed, block 610 points to the first node list entry. As discussed earlier, the node list will contain a list of the nodes already known to the system. This list can be input from the database, or the list can be started from self-seed module. After pointing to the first entry, block 612 determines if there are more entries to process. If there are no more entries to process, block 612 transfers to block 614 which will wait a predetermined period of time before reprocessing the entire node list. Typically, block 614 will wait for approximately thirty seconds. By reprocessing the node list periodically, additional nodes can be discovered. This is because a node may be inactive on the system at any given time and might not be discovered by a single pass through the network. By waiting and reprocessing the node list, nodes that were inactive may now be active and additional information can be obtained.

If more entries in the node list exist, block 612 transfers to block 616 to process one of the nodes. After processing that node, block 616 transfers to block 618 which points to the next node list entry and returns to block 612 to process the next node.

FIG. 7 shows a flowchart for the self-seed block 304 (FIG. 3) which obtains initial information about nodes on the network. Referring now to FIG. 7, after entry, block 702 sends an SNMP broadcast request to all nodes on the network. SNMP stands for Simple Network Management Protocol, and is a part of the TCP/IP network software. After sending the broadcast request, block 702 transfers to block 704 which receives SNMP messages from the nodes. If more SNMP messages are available, block 704 transfers to block 706 which adds a node to the node list for each message received. In this manner, all nodes that are currently active on the network can be queried to obtain initial information about the node. After all SNMP messages have been received, block 704 returns to the caller.

Another way of self-seeding is to query the address translation table for the node that is executing the discovery system. This table will contain the addresses of other nodes on the network, and these addresses are then used to start the discovery process.

Figure 8:
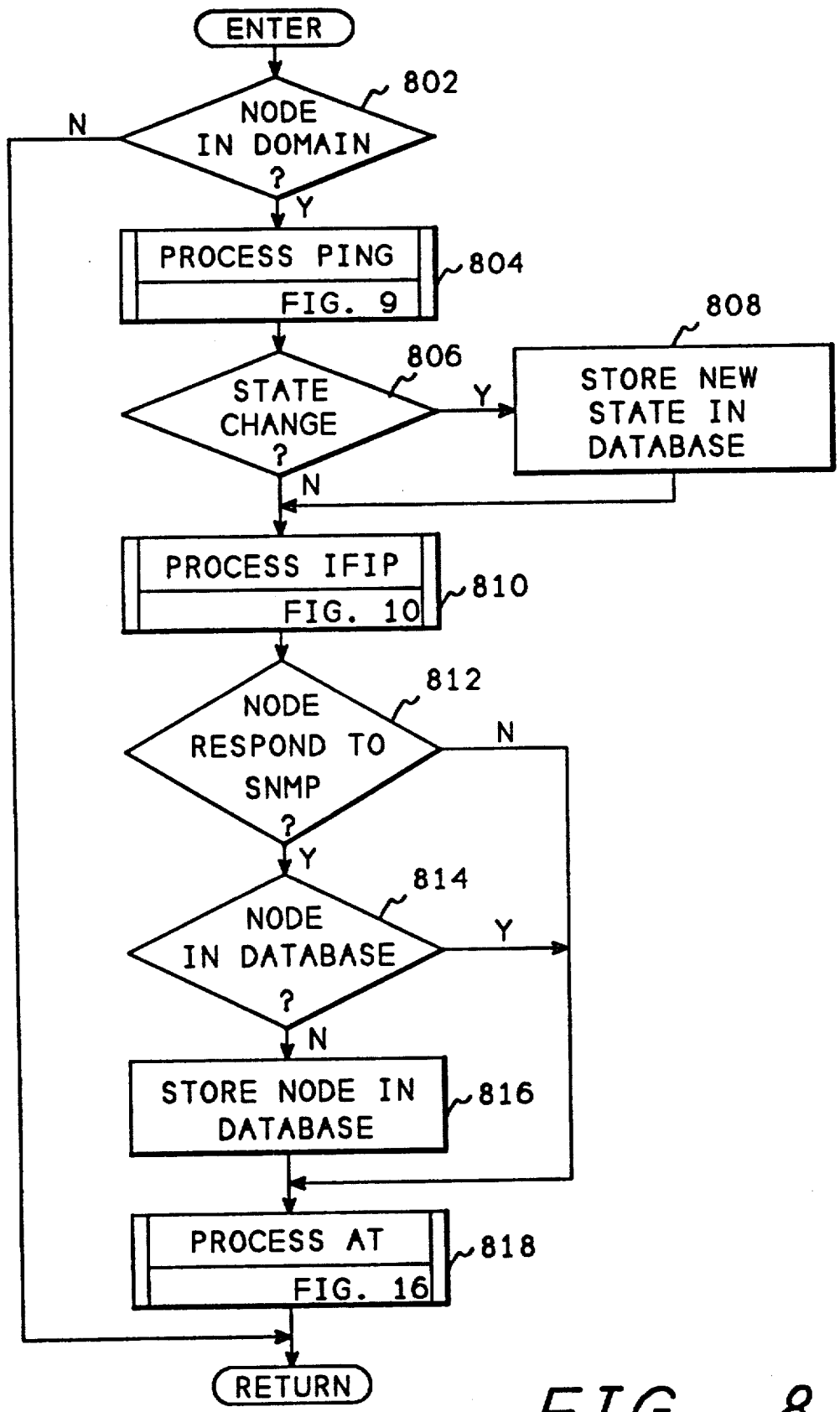
FIG. 8 shows a flowchart of the process-node module of the invention.

FIG. 8 is a flowchart of the process-node block 306 (FIG. 3). The process-node module of FIG. 8 is called from the discovery module of FIG. 6 once for each entry in the node list. Therefore, when FIG. 8 is called, the address of a single node is passed to it. Referring now to FIG. 8, after entry, block 802 determines whether the node is within a domain. As discussed earlier, the domain defines the limits beyond which the discovery program does not wish to discover new nodes. If the node is within the domain, block 802 transfers to block 804 which calls the process-ping module of FIG. 9 to determine whether the node is active. After returning from FIG. 9, block 804 transfers to block 806 to determine whether the state of the node has changed since the last information was obtained. That is, when the process-ping module queries the node, it determines the state of the node at the present time. This state is compared, in block 806, with the state of the node as it was known previously in the database. If that state has changed, block 806 transfers to block 808 to store the new state in the database. Control then returns to block 810 which calls process-IFIP to retrieve the IF and IP tables from the node. After returning from FIG. 10, block 810 transfers to block 812 which determines whether the node responded to an SNMP request. If the node did respond to the SNMP request, block 812 transfers to block 814 which determines whether the node is currently in the database. If the node is not in the database, block 814 transfers to block 816 to add the node to the database. Control then continues at block 818 which calls FIG. 16 to retrieve the address translation table from the node. Control then returns to the caller.

Figure 9:
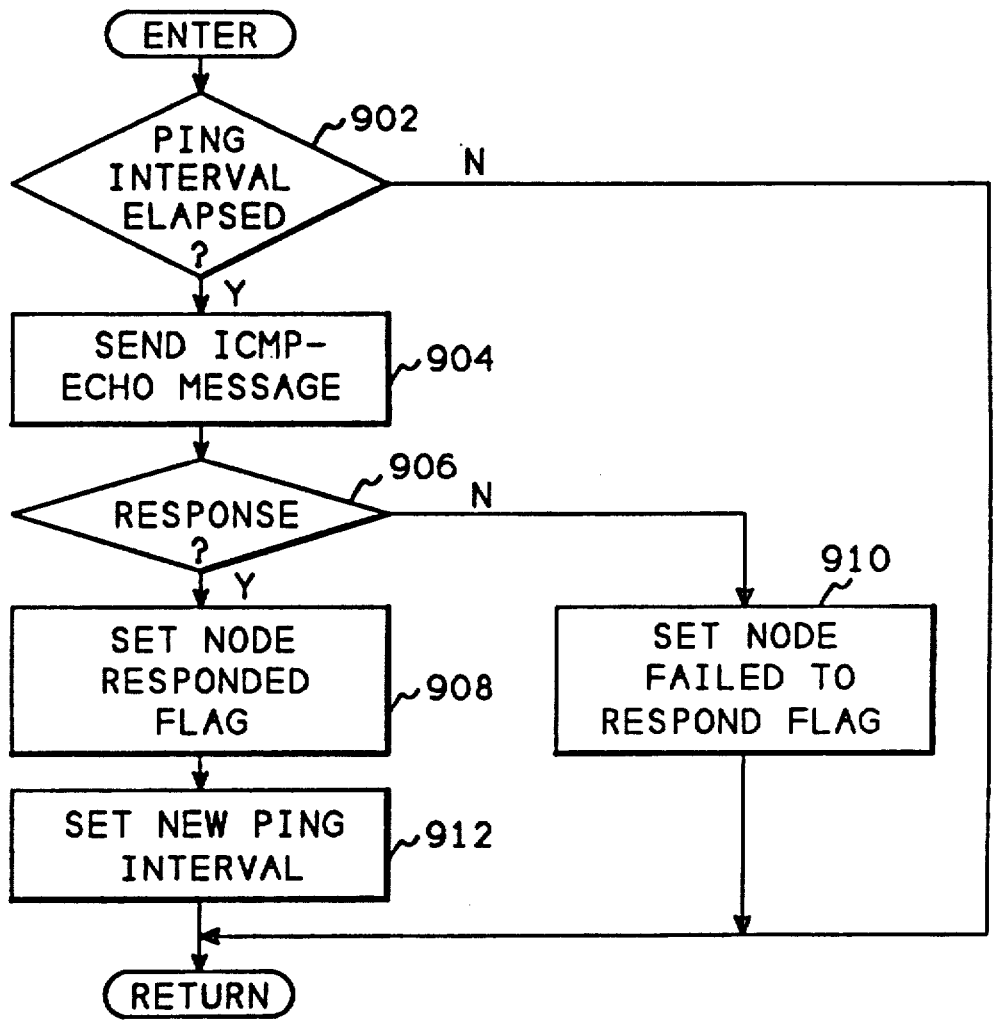
FIG. 9 shows a flowchart of the process-ping module of the invention.

FIG. 9 shows a flowchart of the process-ping module block 308 (FIG. 3). This module is called to determine whether a node is active on the network. Referring now to FIG. 9, after entry block 902 determines whether the ping interval has elapsed. The ping interval is used to prevent a node from being queried too often. If the ping interval has not elapsed, block 902 returns to the caller. If the ping interval has elapsed, block 902 transfers to block 904 which sends an ICMP-echo message to the node. The ICMP-echo protocol is defined as a part of TCP/IP and is used to cause the node to return an acknowledgement to a message. Block 904 then transfers to block 906 which determines whether a response has been received from the other node. If a response has not been received within a predetermined amount of time, typically block 906 transfers to block 910 which sets a flag to indicates that the node failed to respond. If the node does respond, block 906 transfers to block 908 which sets a flag to indicate that the node did respond and then block 912 sets a new ping interval which will prevent the node from being pinged for the period of the interval. The ping interval is typically five minutes. Block 912 then returns to the caller.

Figure 10:
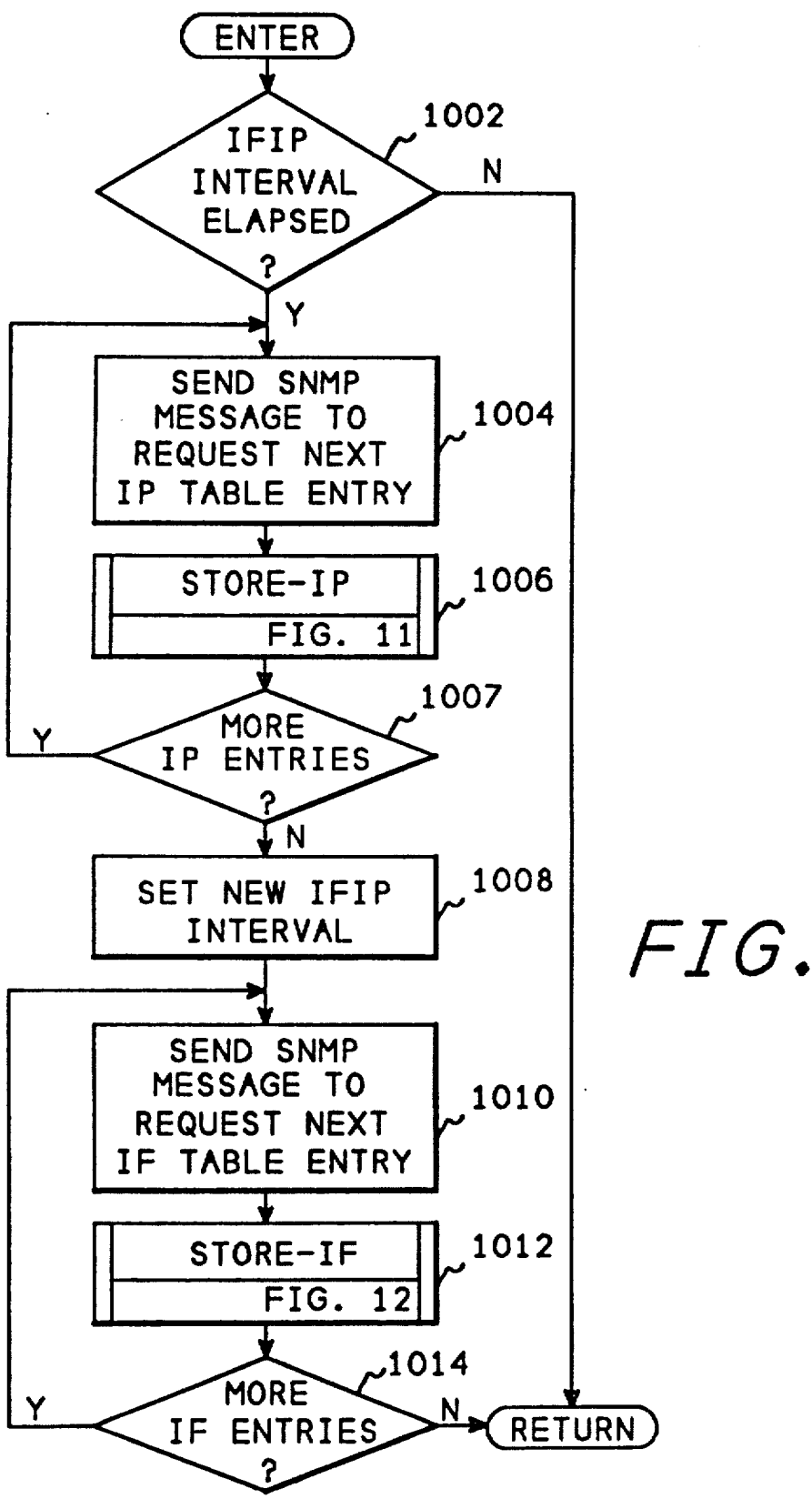
FIG. 10 shows a flowchart of the process-IFIP module of the invention.

FIG. 10 shows a flowchart of the process-IFIP module block 310 (FIG. 3). The IF and IP tables are available in a node to define the translation of physical addresses to IP addresses. The information is available as two different tables, with an index contained in the IF table to cross-reference to the IP table within the node. By obtaining these two tables, the discovery system can determine what the other interfaces to which a node is connected, and therefore determine other networks to which the node is connected. Referring now to FIG. 10, after entry, block 1002 determines whether the IFIP-interval has elapsed. The IFIP interval is similar to the ping interval described with respect to FIG. 9, and is used to keep a node from being queried too often. If the IFIP interval has not elapsed, block 1002 returns to the caller. If the IFIP has elapsed, block 1002 transfers to block 1004 which sends an SNMP message to request the node to send its next IP table entry to the discovery node. When an entry is received, block 1006 calls store-IP module of FIG. 11 to store the node within the node list. Block 1007 then transfers back to block 1004 if more IP entries are available. After all the entries are all stored in the node list, block 1007 transfers to block 1008 which sets a new IFIP interval of typically greater than 10 hours. Block 1010 then sends an SNMP message to request that the node send its next IF table entry to the discovery node. When an IF table entry is received, block 1012 calls the store-IF module of FIG. 12. Block 1014 then transfers back to block 101 if more entries are available. After receiving and storing all the IF table entries, block 1014 returns to the caller. Each IF table entry contains an index into the IP table. By using this index, physical addresses in the IF table can be matched with the IP address.

Figure 11:
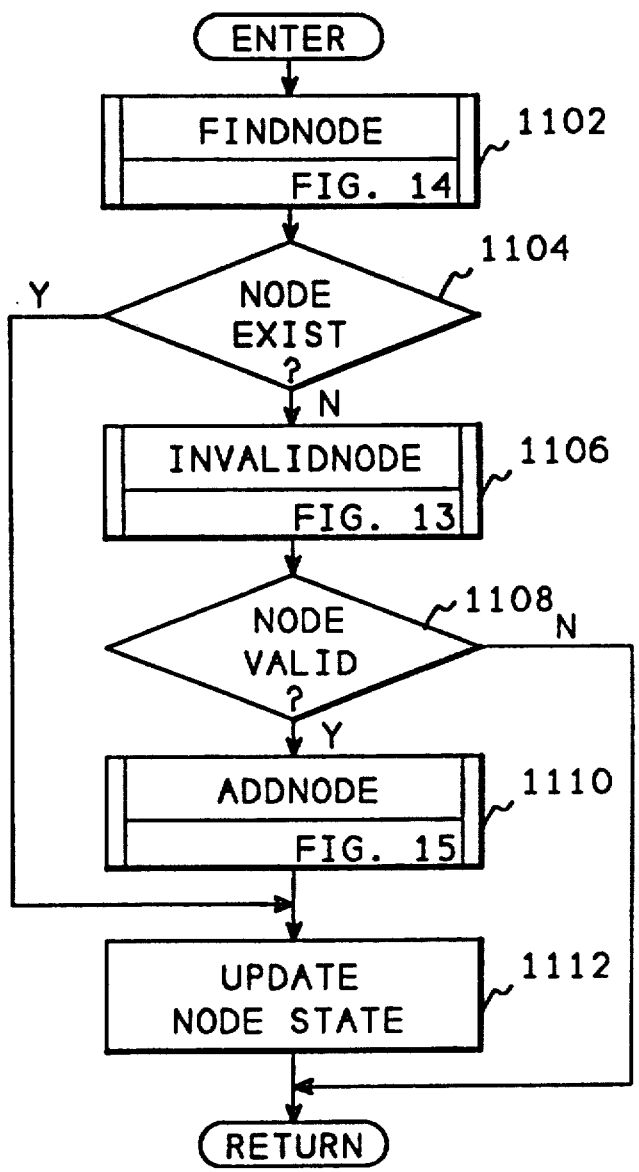
FIG. 11 shows a flowchart of the store-IP module of the invention.

FIG. 11 shows a flowchart of the store-IP process block 402 (FIG. 4). Referring now to FIG. 11, after entry block 1102 calls FIG. 14 to find the node in the node list. The node will be found if the discovery system has already encountered this node in its process. Block 1104 then determines whether the node exists, and if the node does not exist, block 1104 transfers to block 1106 which calls FIG. 13 to determine whether the node is valid. Block 1108 then determines if the node is valid and if it is valid, block 1108 transfers to block 1110 to add the node to the node list. After adding the node, or if the node already existed, control goes to block 1112 which updates the state information about the node. After updating the node state information or if the node was not valid, FIG. 11 returns to the caller.

Figure 12:
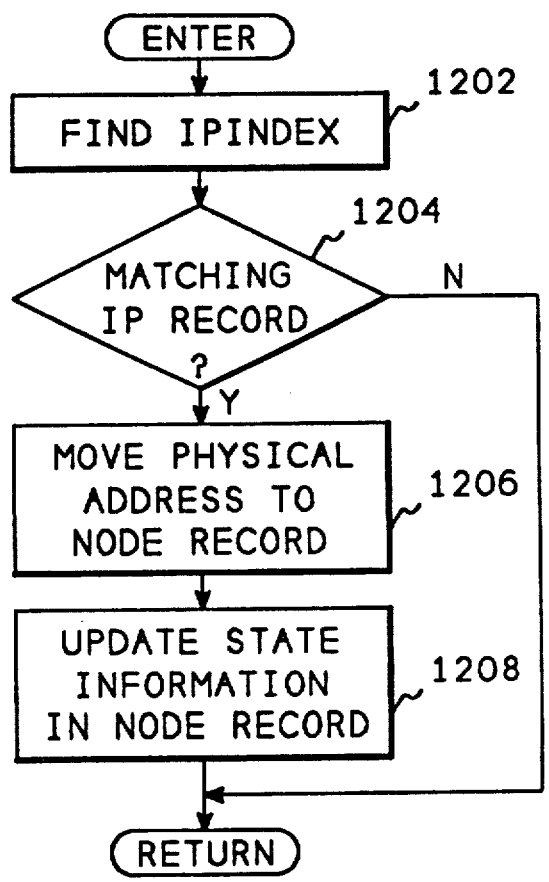
FIG. 12 shows a flowchart of the store-IF module of the invention.

FIG. 12 is a flowchart of the store-IF process of block 404 (FIG. 4). This module is called for each table entry in the IF table received from a node. Referring now FIG. 12, after entry, block 1202 finds the I index within the IF record. As described earlier, each IF table entry will have a corresponding IP table entry, and the IP entry is referenced by an index value contained in the IF entry. Block 1204 then determines whether a matching IP record exists. If a matching IP record does exist, block 1204 transfers to block 1206 which moves the physical address from the IP record to the node record in the node list. Block 1208 then updates any state information in the node record. After updating the state information, or if there were no matching IP record, FIG. 12 returns to its caller.

Figure 13:
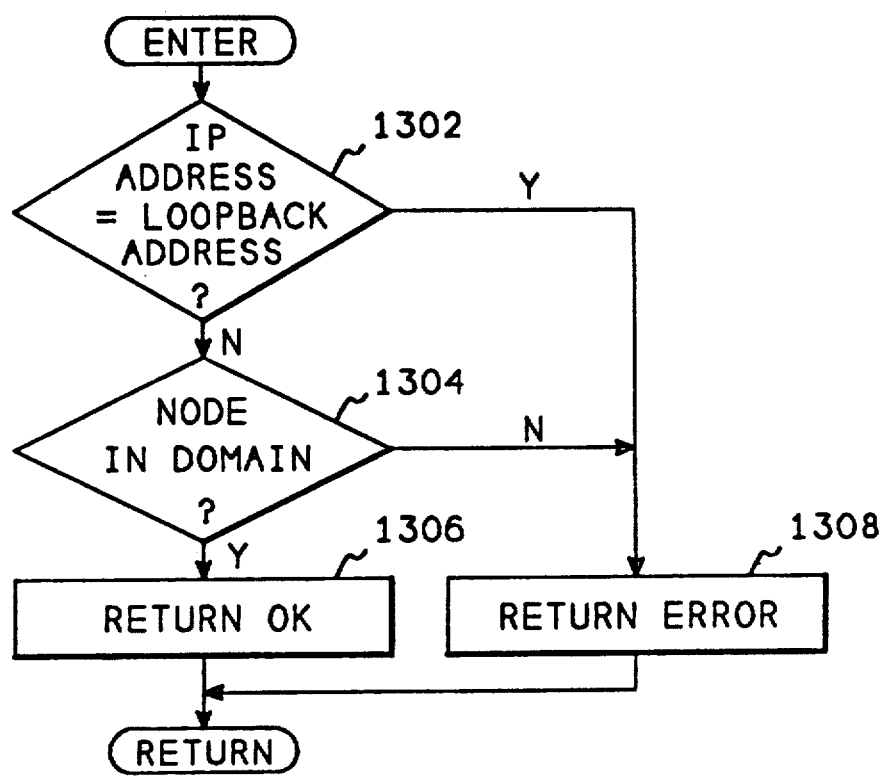
FIG. 13 shows a flowchart of the invalidnode module of the invention.

FIG. 13 shows a flowchart of the invalidnode module block 406 (FIG. 4). Referring now FIG. 13, after entry, block 1302 determines whether the address of the node is simply the loopback address of another node. Each node has a loopback address associated with it for use in testing the node. Because the loopback address refers to the same node, no additional information can be obtained from that node and the loopback address is never stored as a node address. If the IP address is not equal to the loopback address, block 1302 transfers to block 1304 to determine whether the node is within the domain. As described earlier, the domain is used to determine the limits beyond which the discovery system will not attempt to discover new nodes. If the node is within the domain, block 1304 transfers to block 1306 which returns an indication that the node is valid. If the node is not within the domain or if the IP address equals the loopback address, control transfers to block 1308 which returns an error indication indicating that node is not valid. Control then returns to the caller.

Figure 14:
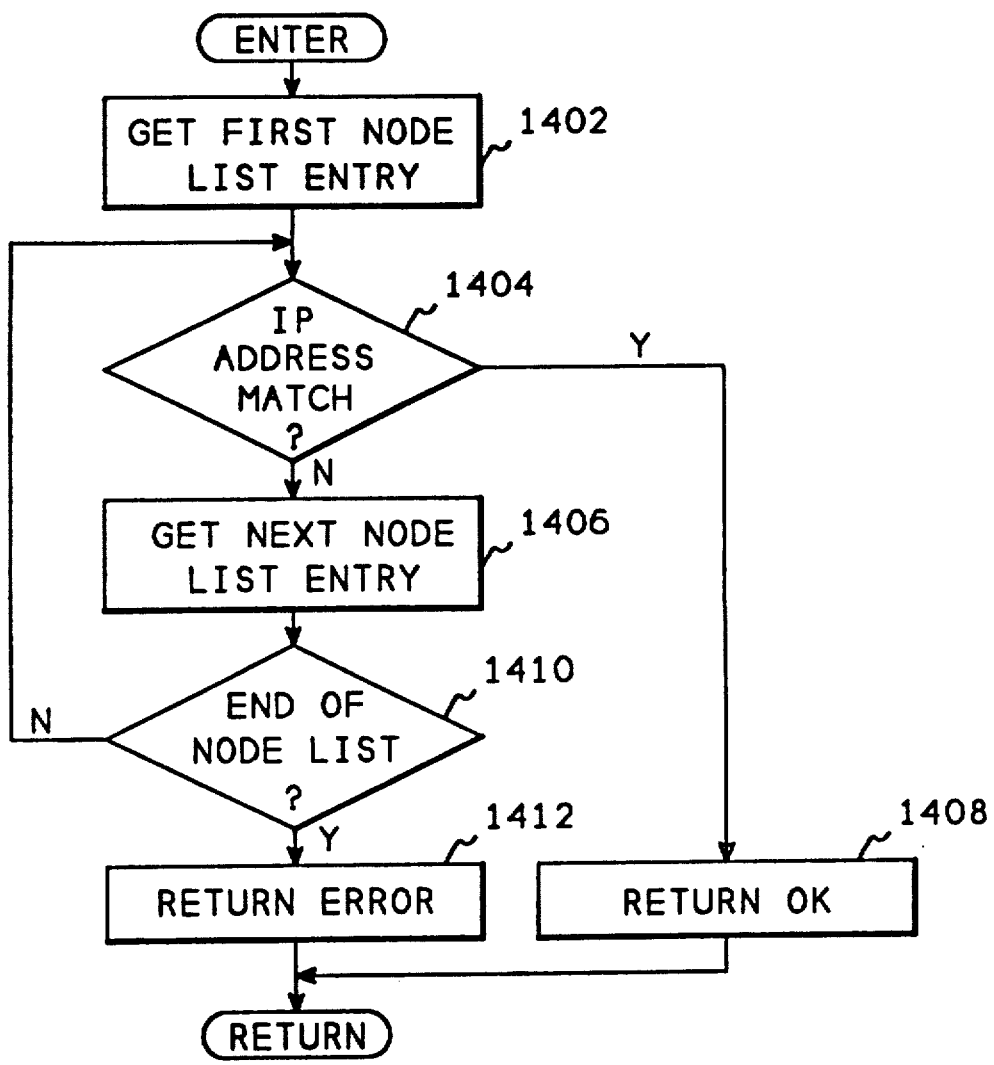
FIG. 14 shows a flowchart of the findnode module of the invention.

FIG. 14 is a flowchart of the findnode module block 408 (FIG. 4). The module is used to find a node within the node list. Referring now FIG. 14, after entry, block 1402 gets the node list entry. Block 1404 then determines whether the IP address matches the entry in the list. If a match does occur, block 1404 transfers to block 1408 which returns an indication that the node is in the node list. If the IP address does not match, block 1404 transfers to block 1406 which gets the next node list entry and block 1410 then determines whether the end of table has been reached. If the end of the list has not been reached, block 1410 transfers back to block 1404 to check the entry just found. If the end of the list has occurred, block 1410 transfers to block 1412 which returns an error indication indicating that the node is not in the node list.

Figure 15:
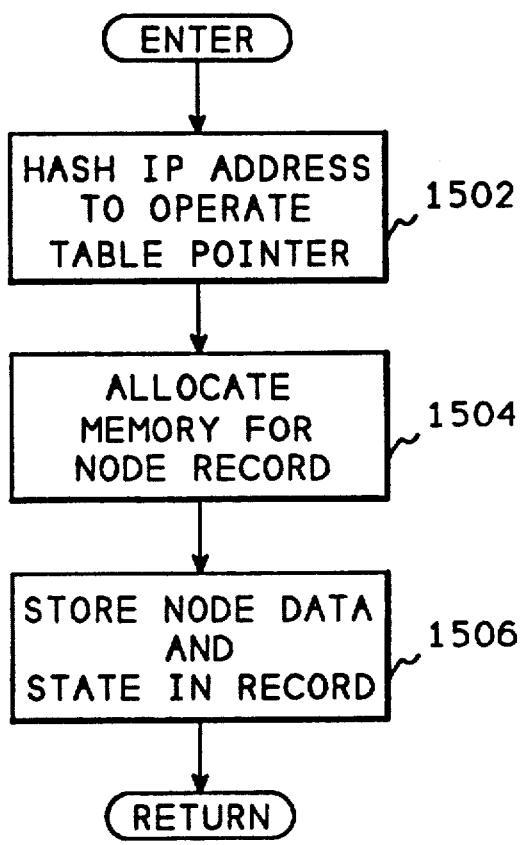
FIG. 15 shows a flowchart of the addnode module of the invention.

FIG. 15 shows a flowchart of the process of adding a node to the node list. Referring now to FIG. 15, after entry, block 1502 performs a hash operation on the IP address to create a pointer into the node list. Block 1504 then allocates memory for a node record, and block 1506 stores the data available for the node into the node record at the location pointed to by the hashed IP address. Block 1506 then returns to the caller.

Figure 16:
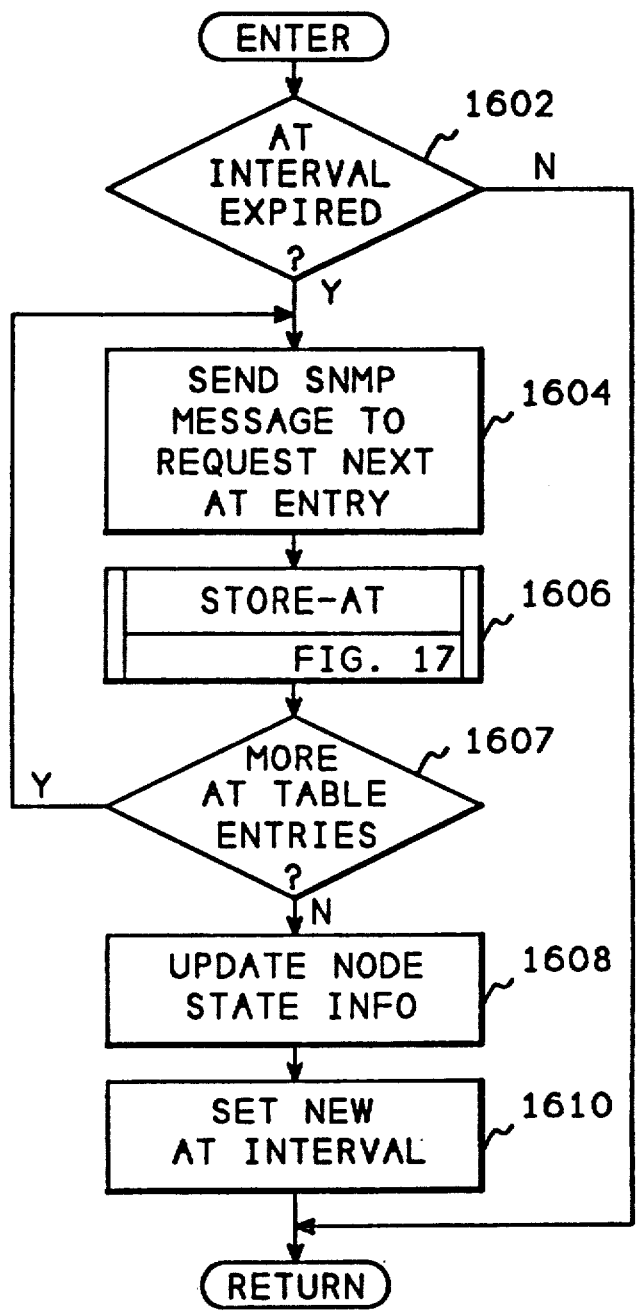
FIG. 16 shows a flowchart of the process-AT module of the invention.

FIG. 16 shows a flowchart of the process-AT module of block 312 (FIG. 3). This module is called by the process-node module for each entry in the node list. Referring now to FIG. 16, after entry, block 1602 determines whether the AT interval has expired. The AT interval is used to prevent a node from being polled too frequently. If the AT interval has not expired, block 1602 simply returns to the caller. If the AT interval has expired, block 1602 transfers to block 1604 which sends an SNMP message to request that the node send its next address translation table entry to the discovery node. When an entry is received, block 1606 is called to store the table entry. Block 1607 then transfers back to block 1604 if more table entries are available. After storing all the table entries, block 1607 transfers to block 1608 which updates the node's state information in the node list. Block 1610 then sets a new AT interval, typically fifteen seconds, and returns to the caller.

Figure 17:
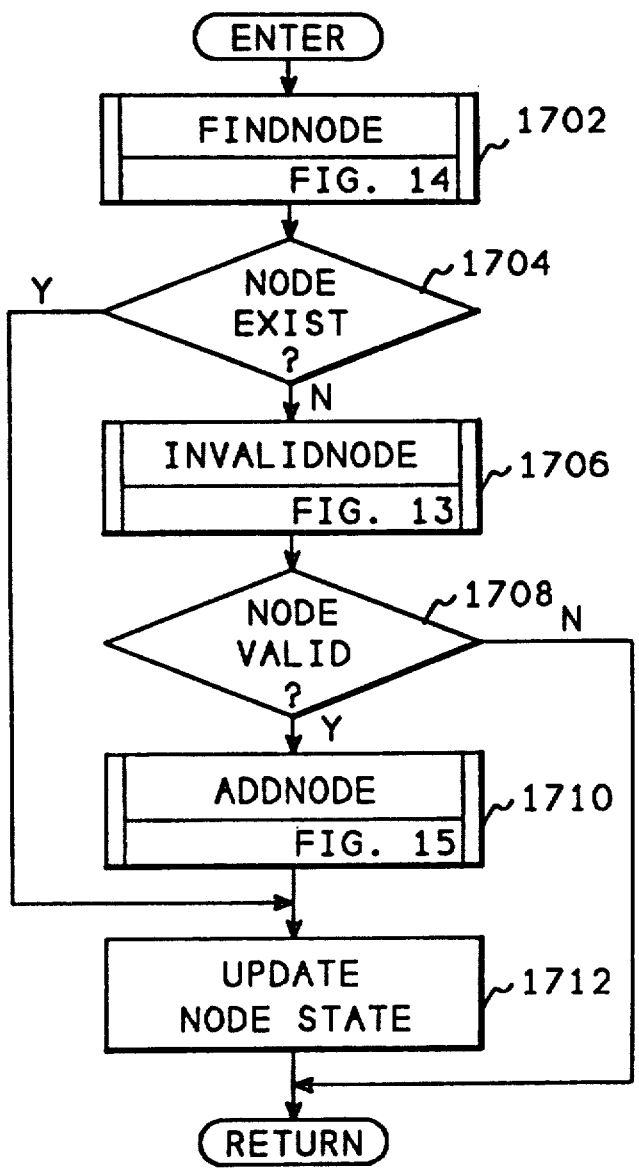
FIG. 17 shows a flowchart of the store-AT module of the invention.

FIG. 17 shows a flowchart of the store-AT module of block 502 (FIG. 5). Referring now to FIG. 17, after entry, block 1702 calls the findnode module FIG. 14 to determine whether the node is already in the node list. If the node is in the node list, block 1704 transfers to block 1712. If the node is not in the node list, block 1704 transfers to block 1706 which calls FIG. 13 to determine whether the node is a valid node. If the node is not valid, block 1708 returns to the caller. If the node is valid, block 1708 transfers to block 1710 which calls FIG. 15 to add the node to the node list. After adding the node to the node list, or if the node already existed, control to transfers block 1712 which updates the state information about the node in the node list before returning to the caller.

In addition to querying nodes on the network, the discovery system can also query any network probes that may be attached to the network. Information about other nodes on the network can be obtained from these probes, and the discovery system can use this information to assist in discovering other nodes on the network.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A computer network node discovery process for determining nodes connected to a computer network, said process comprising the steps of:
   (a) obtaining, from one node of a set of known nodes on said computer network, a list of addresses of one or more other nodes with which said one node communicates comprising the steps of
      (a1) obtaining from each bridge unit connected to said network a list of addresses of all nodes accessible by said bridge unit,
      (a2) obtaining from each route unit connected to said network a list of addresses of all nodes accessible by said router unit,
      (a3) obtaining from each gateway unit connected to said network a list of addresses of all nodes accessible by said gateway unit,
   (b) repeating step (a) for each of said other nodes obtained; and
   (c) storing said list of node addresses in a file;
   (d) repeating steps (a) through (c) at regular time intervals;
whereby said list of node addresses may be displayed to a user of said computer network.

2. The process of claim 1 further comprising the step of:
   (a4) obtaining from any network probe device connected to said network a list of addresses of all nodes known to the said network probe device.

3. A computer network node discovery process for determining nodes connected to a TCP/IP computer network, said process comprising the steps of:
   (a) obtaining, from one node of a set of known nodes on said computer network, an address translation table containing a list of addresses of other nodes with which said one node communicates, by said gateway unit,
   (b) repeating step (a) for each of said other nodes in said address translation table;
   (c) storing said list of nodes in a file.

4. The process of claim 3 further comprising the step of:
   (d) repeating steps (a) through (c) at regular time intervals.

5. The process of claim 4 further comprising the step of:
   (a1) obtaining from each bridge unit connected to said network an address translation table containing a list of addresses of nodes accessible from said bridge unit.

6. The process of claim 4 further comprising the step of:
   (a2) obtaining from each router unit connected to said network an address translation table containing a list of addresses of nodes accessible from said router unit.

7. The process of claim 4 further comprising the step of:
   (a3) obtaining from each gateway unit connected to said network an address translation table containing a list of addresses of nodes accessible from said gateway unit.

8. The process of claim 4 further comprising the step of:
   (a4) obtaining from any network probe devices attached to said network a list of addresses of all nodes known to said network probe.

9. The process of claim 4 further comprising the step of:
   (a5) obtaining from each node in said network an interface table and an internet protocol address table which defines other networks and nodes to which said node is connected.

10. A computer network node discovery process for determining nodes connected to a computer network, said process comprising the steps of:
   (a) sending a general response message to all nodes on said network;
   (b) creating a node list containing the address of each node responding to said general response message;
   (c) obtaining, from each node in said node list, a second list of addresses of other nodes with which said node communicates;
   (d) adding each node in said second list to said node list;
   (e) repeating steps (c) through (d) for each of said nodes in said second list;
   (f) storing said node list in a file.

11. The process of claim 10 further comprising the step of:
   (g) repeating steps (a) through (f) at regular time intervals.

12. The process of claim 11 further comprising the step of:
   (c1) obtaining from each bridge unit connected to said network a list of addresses of all nodes accessible by said bridge unit.

13. The process of claim 12 further comprising the step of:
   (c2) obtaining from each router unit connected to said network a list of addresses of all nodes accessible by said router unit.

14. The process of claim 13 further comprising the step of:
   (c3) obtaining from each gateway unit connected to said network a list of addresses of all nodes accessible by said gateway unit.

15. The process of claim 14 further comprising the step of:
   (c4) obtaining from any network probe devices attached to said network a list of addresses of all nodes known to the network probe.

16. A computer network node discovery process, contained within a node connected to said computer network, for determining nodes connected to said computer network, said process comprising the steps of
   (a) obtaining from said node containing said discovery process a node list of addresses of all other nodes with which said node communicates;
   (b) obtaining, from each node in said node list, a second list of addresses of other nodes with which said node communicates;
   (c) adding each node in said second list to said node list;
   (d) repeating steps (b) through (c) for each of said nodes in said second list;
   (e) storing said node list in a file; and
   (f) repeating steps (a) through (e) at regular time intervals;

whereby nodes connected to said computer network are determined and made available for display to a user of said computer network.

* * * * *